UNITED STATES PATENT OFFICE.

JOHN ASHFORD, OF AMRITSAR, INDIA.

CONVEYER.

No. 924,303.  Specification of Letters Patent.  Patented June 8, 1909.

Application filed October 29, 1907. Serial No. 399,732.

*To all whom it may concern:*

Be it known that I, JOHN ASHFORD, a subject of the King of Great Britain and Ireland, and residing at Amritsar, Punjab, India, have invented certain new and useful Improvements in and Relating to Conveyers.

This invention relates to conveyers and more particularly to the type employing a fixed aerial wire along which the skips or buckets are drawn by a running wire or cable.

The principal object of the invention is to arrange the supports for the fixed aerial wire so that sufficient tension may be placed on the wire without the supports being fixed or anchored to the ground, whereby the whole plant is rendered readily portable.

Further objects of the invention are to increase the carrying capacity of the plant by increasing the number of skips or other receptacles for the material, that can be loaded and despatched in a given time, and also to provide means whereby the loaded skips are automatically despatched at suitable intervals without danger of collision.

Another object of the invention is to provide an improved device for automatically gripping and releasing the running wire or cable to and from the skip or other receptacle.

The invention briefly comprises a fixed rope or wire which is divided into a number of comparatively short lengths the ends of which are led over supporting pulleys or guides conveniently arranged on portable standards and down to suitable winches or like devices for applying tension to the wire or rope. By this device the intermediate standards are balanced, as near as is desired, by the pull of the wire on either side and the tension on the end standards is only equal to that due to the weight of the rope and skips on the last span so that these also may be mounted on wheels.

The invention further comprises the arrangement of two or more hoppers and chutes at any desired loading point, to which the skips or the like are successively guided by means of branch lines and, after being filled, are despatched in order and return to the main line or wire. To prevent the simultaneous despatch of two skips from their filling hoppers, interlocking means are provided by which the loading and despatching mechanism at any one hopper is retarded in action until the previously loaded skip has been despatched.

Another feature of the invention is the gripper on the skip or the like which consists of two rollers arranged so that a tapered space exists between them and into which the running rope or cable is adapted to pass. By suitably raising or lowering the level of the running cable with relation to the skip or the like and its rollers, such cable either leaves the space between the rollers and thus leaves the skip free or is depressed into gripping relation with the rollers and carries the skip forward.

Referring now to the accompanying drawings, which illustrate one convenient form of apparatus constructed according to the invention, Fig. 3 is a diagrammatic plan of the arrangement of tracks at the loading point, Figs. 10 and 11 are elevation and plan views respectively of one form of grip for the haulage cable.

Duplicate wires $a$ and $b$, are employed for the outgoing full skips and the returning empty skips, respectively, in the usual way, each skip or bucket, $c$, being provided with a jockey having grooved wheels, and semi-circular tracks being provided at the ends of the apparatus to divert the skips from the outgoing to the returning wires and vice versa. The skips hang below and are provided with bottom doors for discharging their contents which may be opened and closed by any suitable means and at any desired point or points along the track. Each jockey is provided with a gripper, d, in which the running cable, e, normally lies.

The sections of the fixed wire or rope, a and b are placed over supporting pulleys or guides f, on the portable standards, g, and the two ends on each intermediate standard are preferably connected to the same winch, h, through the medium of a shackle, h' and ropes h², so that when applying the tension the two sections of rope are simultaneously raised and thus assist in keeping the standard in equilibrium.

Figure 4:
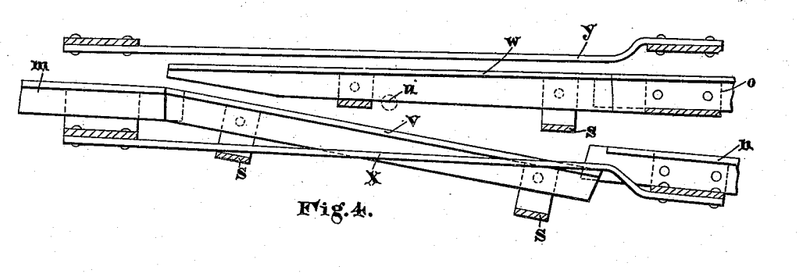
Figs. 4 and 5 are detail plan and elevation respectively of the switch.
Figure 5:
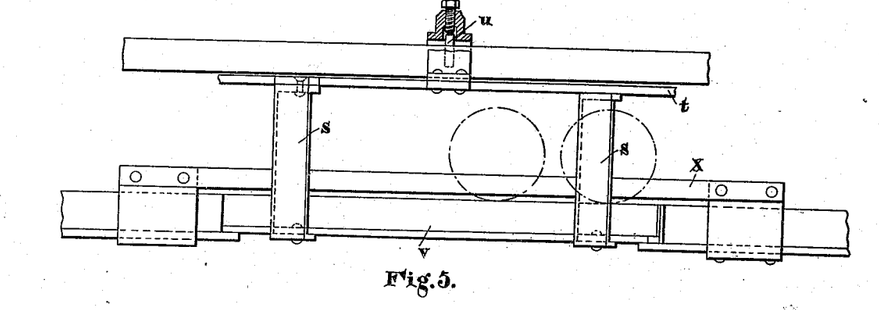

I have found that the fixed ropes a and b, may be conveniently arranged in two-span lengths and in each standard, g, the tension applied only to one set of ropes. Thus the fifth standard say, may tension the returning rope, b, the sixth standard the outgoing rope, a, and so on alternately right and left. Each standard, g, is preferably constructed of braced angle irons secured to a tanklike base, i, mounted on wheels and into such tanks sand or rock ballast may be placed, if necessary, to give stability. The apparatus for loading the skips, c, may be placed at any point along the rope and at this point the skips are caused to leave the main line, a, and run on to a branch line, m, which guides the skips back to the main line, a, after being loaded. The branch line or track, m, is further divided into as many sub-branches as there are loading hoppers. Thus for two loading hoppers, as shown in the drawings, the branch line is divided into two parts n and o, arranged in "parallel" and each hopper p and q, is adapted to load the skips which are diverted to its corresponding sub-branch. The mechanism I employ for diverting the skips to the different hoppers and which forms an important feature of the invention is as follows:—Each skip or bucket when it leaves the main track, a, approaches and runs on to a switch rail, r, pivoted or supported so as to move through a suitable angle and operated by the momentum of the approaching skip as will now be described. The switch is suspended by hangers, s, from a plate, t, pivoted to the framework at u, and is provided with two rail portions, v, and w, adapted to register at one end with the rails n and o respectively and at the other end with the rail, m. The forward wheel, of the skip when it advances along the rail, v, say of the switch, r, is opposed, as shown in Fig. 4, by a fixed rail or bar, x, which causes a reaction between the wheel and the bar, and the wheel and the rail so as to produce a lateral pressure which causes the switch to rotate about its pivot, u, and bring the rail, v, into alinement with the sub-branch line, n, upon which the skip is to be delivered. This motion throws the other end of the rail, v, out of alinement with the rail, m, and brings the rail, w, into alinement therewith. The next skip will run onto the rail, w, and acting in a similar manner to that above described against the rail, y, reverses the switch and runs on to the other sub-branch line, o. Thus each skip passes to the opposite loading hopper to that of the preceding skip.

It will be understood that, as an extension of the manner of diverting the skips, either or both of the aforesaid sub-branches, o, n, could be further subdivided whereby either three or four hoppers could be employed.

Each hopper chute, 2 and 3, is automatically set in operation, to load the skip, by the approach of the skip, preferably by mechanism such as described in the specification of my concurrent application.

Figures 3, 9:
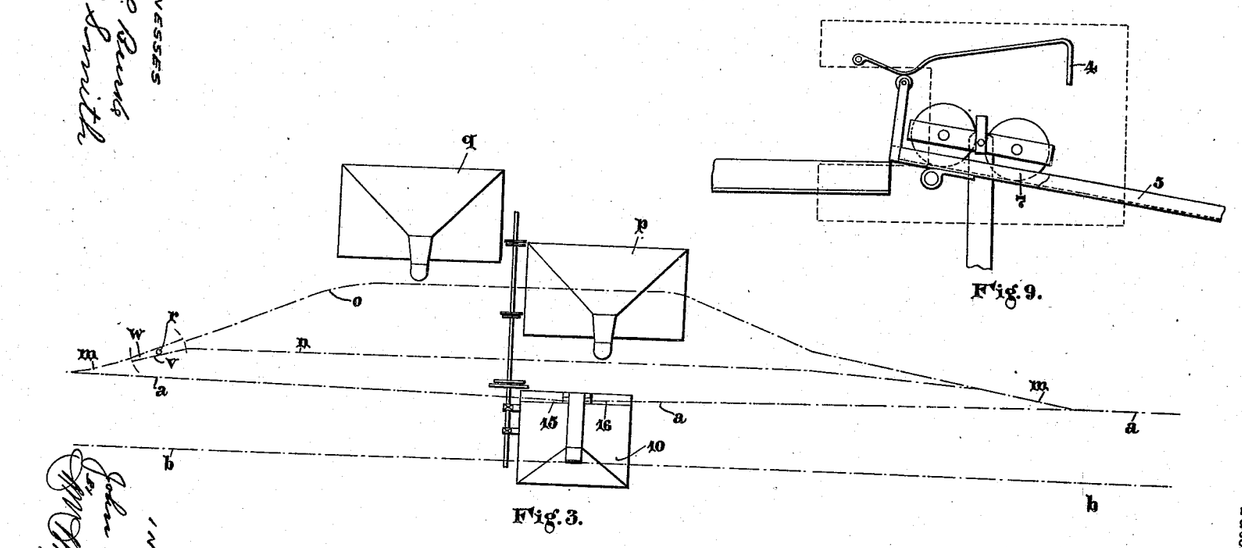
Figure 6:
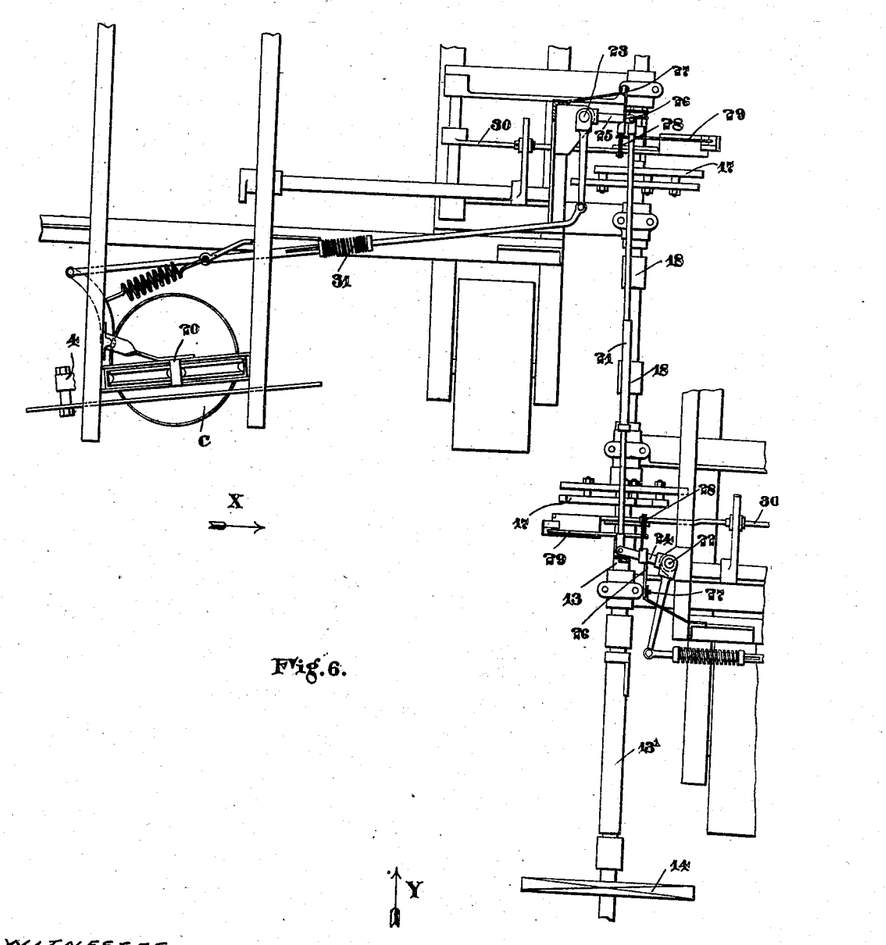
Fig. 6 is a detail plan of part of the loading and despatching mechanism, Fig. $6^a$ is a detail plan of the remainder thereof.

Owing to the momentum of the skips being utilized to operate the switch, r, they advance to the filling hoppers p and q at a slow speed and they are finally brought to rest beneath the hoppers by means of interposed stops 4. After a skip has been filled and released it runs down an inclined rail, 5, and rejoins the branch, m, and then the main line, a. When a skip leaves the main line, a, the haulage rope or cable, e, is automatically detached, as hereinafter more particularly described, from its gripper, d, and when rejoining the main line, a, the haulage rope is automatically gripped again. Between these points the skip is propelled up to the loading point by the momentum imparted by the rope, e, or by inclining the rail, if desired and after leaving the loading point, by the momentum imparted by gravity on an inclined pivoted rail, 7, and the further inclined rail 5. By this device it will be observed that a skip rejoins the main line, a, at a lower level and therefore a readjustment of the level of the haulage or running rope, e, becomes necessary. To accomplish this the ordinary form of intermediate standard, g, which is provided with two side pulleys, 8 and 9, for the outrunning and in-running portions of the rope, e, respectively, is replaced by a special form of standard 10, partially shown in Fig. 7ᵃ. This standard is arranged at about the middle of the side or branch line or track and is provided, on one side, with upper and lower guide pulleys, 11 and 12, for the out-running haulage line e. The grippers, d, on the skips are adapted to be rendered operative or inoperative by the lowering or raising of the haulage rope, e, relatively thereto and consequently the upper guide pulley, 11, is arranged at such a height that the running rope, e, is caused to leave the gripper just before its skip enters the side track, m. The running rope after passing over this upper pulley descends almost vertically to the lower guide pulley, 12, which is arranged at such a height as to pick up the grippers just as the skip reaches the main line, a, again or thereabouts. The rotation of the lower guide pulley, 12, is preferably employed to drive the shaft, 13, through gearing 14, such shaft actuating the mechanism for automatically loading and despatching the skips. The gearing, 14, drives the shaft, 13, through a flexible telescopic section, 13', so that it is not necessary for the standard, 10, to be brought into a perfectly accurate position. The fixed rope corresponding to the above described portion of the haulage rope, viz:—the fixed rope, a, on which the out-going full skips run, is also suitably adjusted in level by having its adjacent ends, 15 and 16, (see Fig. 3) connected at the proper heights to the special form of intermediate standard, 10. The mechanism for automatically loading and despatching the skips is driven by the motion shaft, 13, on which is arranged a separate operating cam, 17, or like device for each chute, such shaft, 13, being coupled up in several lengths by flexible couplings, 18, when necessary. Each cam, 17, or like device is rendered operative by means of linkage actuated by the corresponding approaching skip, as fully described in the afore-mentioned specification, but in order that two skips, if approaching almost simultaneously, shall not be despatched simultaneously and thereby foul each other at the return junction of m, with the main line, interlocking gear is provided to prevent simultaneous operation of the two chutes, 2 and 3. This interlocking gear acts in the following manner:—When one skip advances into loading position, on the line, n, say, and by contact with a lever, 19, sets the corresponding loading mechanism into action and a second skip following closely is switched to the adjacent chute, 2, on the line, o, such second skip also contacts with and operates its corresponding lever, 20. A locking rod, 21, (see Figs. 6 and 6ª) has in the meantime however been actuated by the chute, 3, mechanism positively preventing movement of the chute 2 mechanism.

The arrangement of this interlocking mechanism is, more particularly, as follows:— Upon the vertical shafts, 22 and 23, are fixed levers, 24 and 25, hereinafter called the locking levers, which are connected by a telescopic locking rod, 21. This rod is adapted to freely extend but cannot shorten beyond a minimum length. Further, when either of the locking levers, 24, 25, is actuated by the skip-operated mechanism it is itself locked in position by a catch, 26, pivoted at 27. These catches, 26, are released at the correct time by means of triggers, 28, pivotally mounted at 32 on the substantially vertical rods, 29, actuated by the cam levers, 30. The operation of this interlocking gear is as follows:—When a skip comes to rest beneath chute, 3, the arm, 19, is actuated to throw into operation the cam mechanism of such chute. Incidentally the vertical shaft, 22, is rocked and the lever, 24, moved over so as to shorten the rod, 21, to its minimum length and the corresponding catch, 26, drops into position, locking the lever, 24, against backward movement. It is impossible now for the lever, 25, to be moved forward and therefore if a skip comes under chute, 2, it will operate the arm, 20, to merely compress the spring, 31. Upon the loading operation from chute, 3, being completed its cam actuated lever, 30, is raised and, through the corresponding rod, 29, actuates the trigger, 28, and releases the catch, 26. The chute, 3, mechanism now returns to normal position and the chute 2 mechanism is free to be operated. The interlocking gear is similarly actuated when a skip comes under chute 2 first, to prevent actuation of chute, 3. By means of this interlocking mechanism the departing skips are automatically spaced at suitable intervals along the rope. By thus arranging several hoppers and chutes a large surface is provided for throwing the material into the hoppers, a point which is of great convenience when the hoppers are being manually filled and moreover, a considerable saving of time is effected by the rapidity with which the actuation of the chutes may be adapted to follow one another. A deflection plate, 37, is provided in each hopper to screen the material from the chute opening so as to avoid jamming of the material.

Figures 6A, 10, 11:
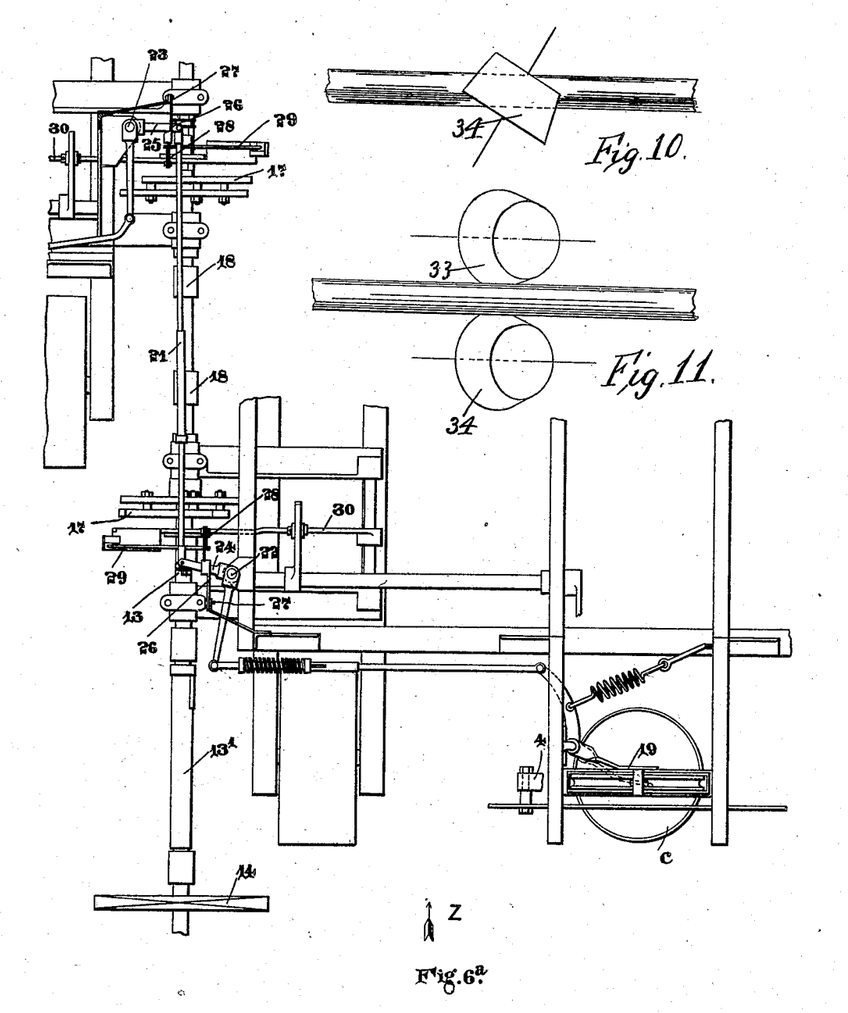
Figure 7:
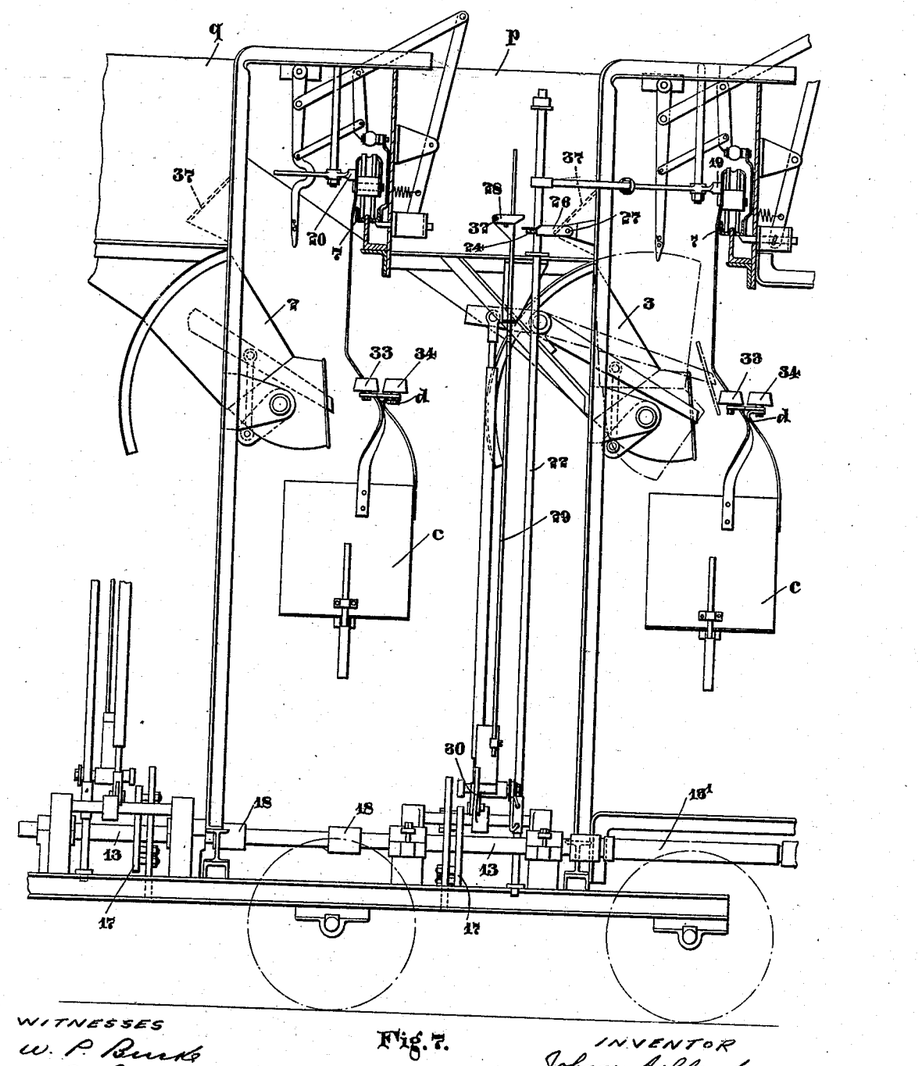
Fig. 7 is a side elevation of the loading and despatching mechanism looking in the direction of the arrow X, Fig. 6, Fig. $7^a$ is a side elevation, looking in the same direction, of the means for driving the loading mechanism.
Figure 7A:
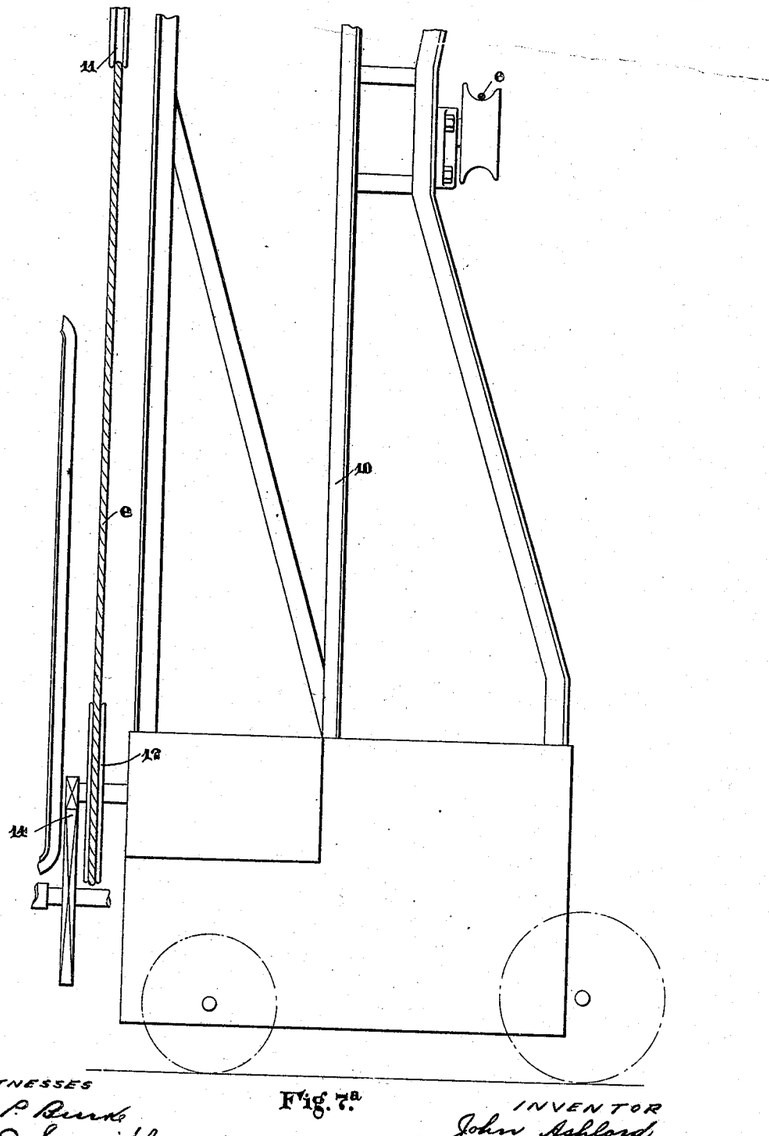
Figure 8:
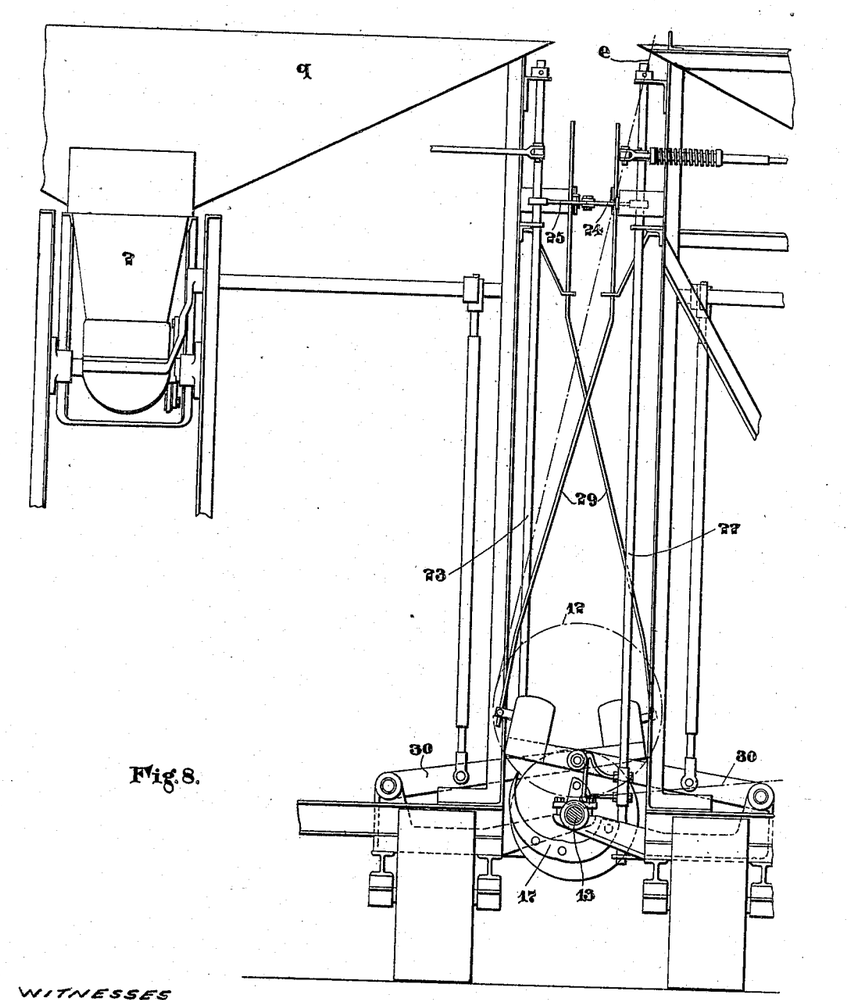
Fig. 8 is an end elevation of the mechanism shown in Fig. 6, viewed in the direction of the arrow Y, Fig. $8^a$ is an end view of the mechanism shown in Fig. $6^a$, viewed in the direction of the arrow Z and, Fig. 9 is a detail elevation of the tilting rail portion upon which the skip or the like is supported during its filling operation.
Figure 8A:
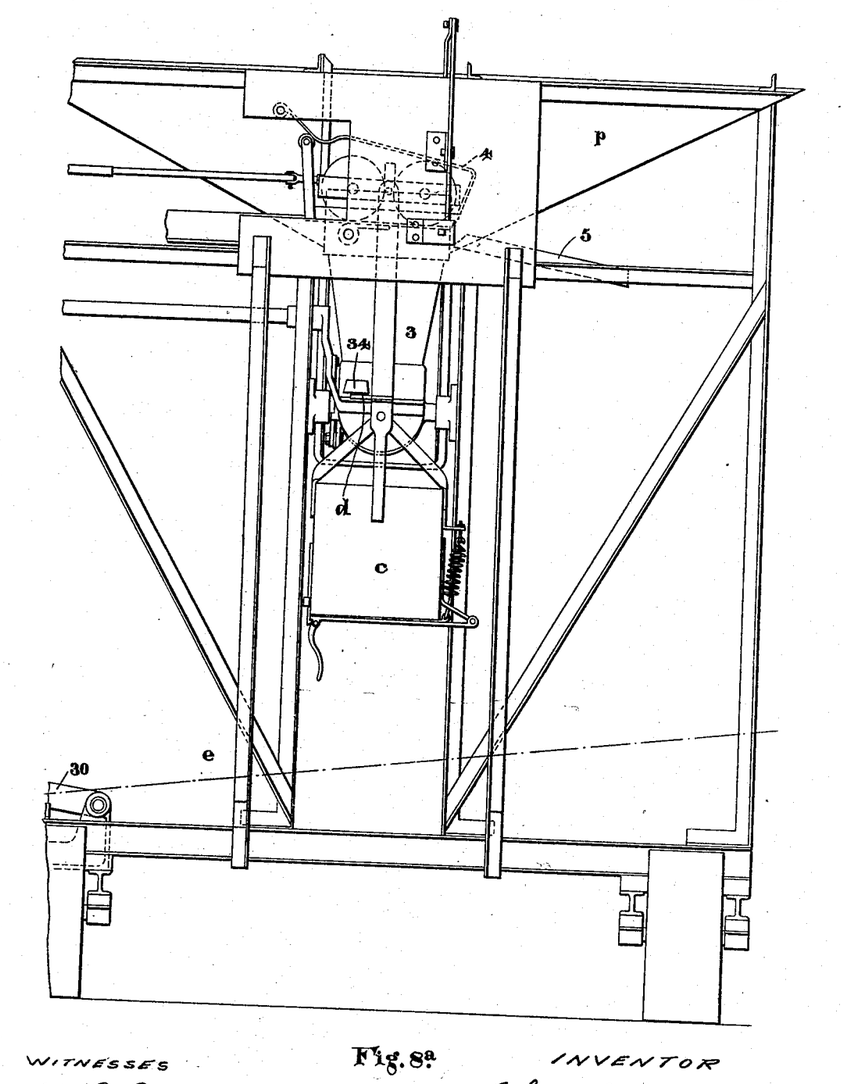

A further and important feature of the invention is the means by which the automatic releasing and gripping of the haulage cable, e, is effected. This device consists of a pair of rollers, 33, and 34, (see Fig. 7) arranged on the skip or the like in a suitable position to be engaged by the haulage cable and suitably shaped or tilted to form a V-shaped grip for the cable. The rollers may be conical and mounted upon parallel spindles as shown, such spindles being vertical as shown in Fig. 7 or inclined as shown in Figs. 10 and 11. It is not necessary for the spindles to be parallel, however, since they may be outwardly or inwardly inclined and their conical slope altered to suit. The rollers 33 and 34, may also be concentric or slightly eccentric and may also have plain or serrated surfaces as desired. Further the rollers may be cylindrical and have their axes inclined so that their adjacent surfaces are inclined for the same purpose.

Figure 1:
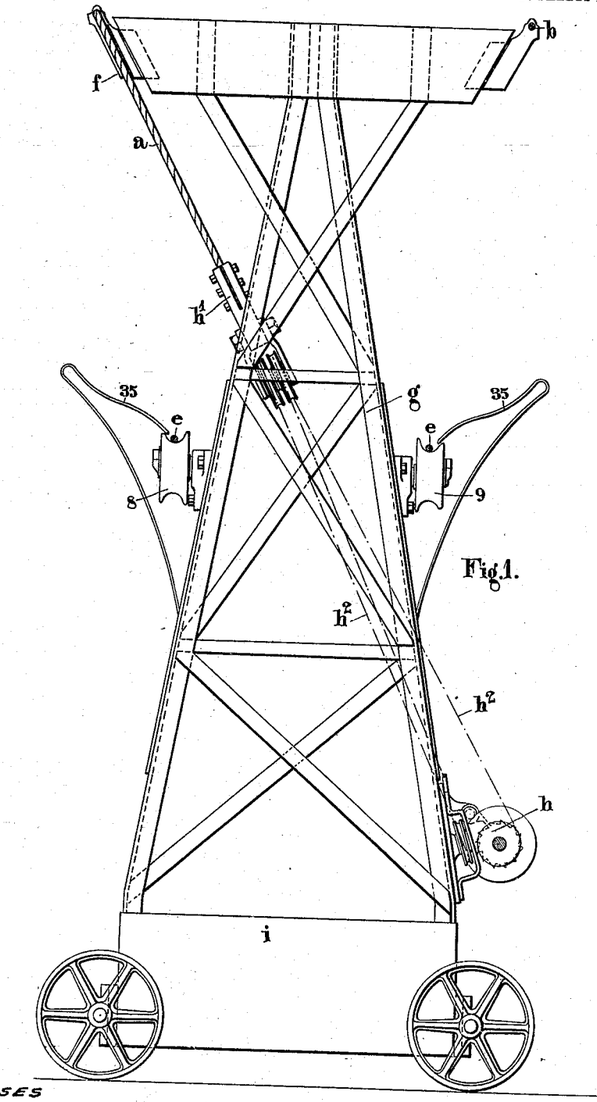
Figure 1 is an end elevation of an intermediate supporting standard, and Fig. 2 a side elevation of the same.
Figure 2:
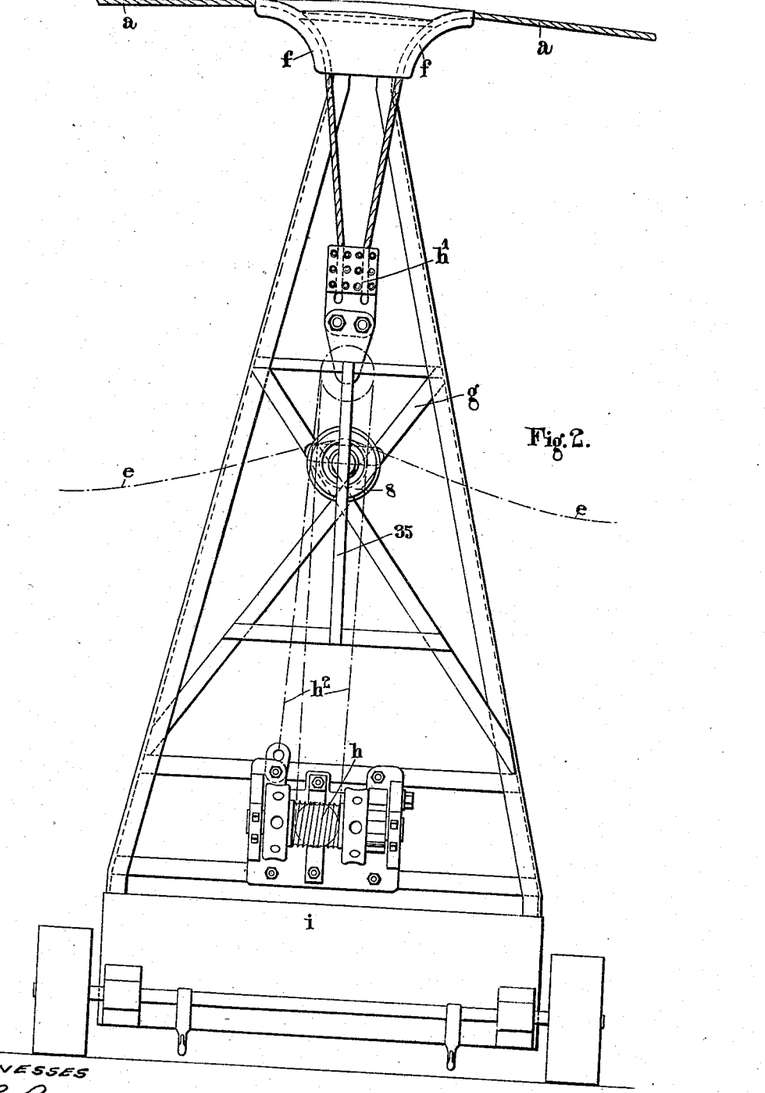

The haulage cable, e, is released or gripped merely by raising and lowering its level relatively to the rollers, 33 and 34. When the rope, e, is lowered down between the rollers its weight rests upon and rotates them until the friction of the revolving surfaces is so great as to firmly grip the cable. The conical rollers, 33 and 34 are preferably, to assist in this gripping action, inclined with their upper or smaller ends toward the direction in which the cable, e is running. Upon raising the level of the cable or rope the rollers first revolve slightly in reverse direction and the cable, which was firmly gripped, leaves the gripper with very slight effort. The running cable, e, is brought back onto guide rollers 8 and 9, after a skip passes the corresponding standard g, by means of guides, 35, as shown in Fig. 1.

It will be understood that the various details of the improved conveying apparatus, as herein described, may be modified without departing from the spirit of the invention and also that the apparatus may be employed for conveying any kind of material from one point to another. It has, however been found particularly adapted for conveying the excavated material when cutting canals and the like, to a considerable distance over irregular country. It will also be understood that the various features of the invention are applicable to other forms of conveyer than the form particularly described herein and that some of such features may be employed without the others.

Having now described my invention, what I desire to secure by Letters Patent is:—

1. Conveying apparatus comprising a receptacle for the material to be conveyed, a cable composed of comparatively short lengths upon which said receptacle is adapted to run, portable standards to which the adjacent ends of said lengths are secured, and means for simultaneously tensioning said adjacent ends.

2. Conveying apparatus comprising a receptacle for the material to be conveyed, a cable composed of comparatively short lengths upon which said receptacle is adapted to run, portable standards each provided with a winch, and means operated by each of said winches for simultaneously tensioning the adjacent ends of said lengths.

3. Conveying apparatus comprising a receptacle for the material to be conveyed, a cable composed of comparatively short lengths upon which said receptacle is adapted to run, portable standards for supporting the adjacent ends of said lengths, connecting members to which said adjacent ends are rigidly secured and means, mounted on said standards, for adjusting said connecting members so as to simultaneously tension said adjacent ends.

4. Conveying apparatus comprising a receptacle for the material to be conveyed, a cable composed of comparatively short lengths, upon which said receptacle is adapted to run when loaded, a similar cable, arranged parallel to the first mentioned cable, upon which said receptacle is adapted to run when empty, portable standards for supporting said cables, means for simultaneously tensioning the adjacent ends of one of said cables upon some of the standards, and means for simultaneously tensioning the adjacent ends of the other of said cables upon other of the standards.

5. Conveying apparatus comprising a plurality of receptacles for the material to be conveyed, a fixed track along which said receptacles are adapted to run, a plurality of hoppers adjacent a loading point on said track, means for automatically guiding said receptacles to said hoppers in succession, means for automatically loading said receptacles from said hoppers, and means for despatching the loaded receptacles along said track.

6. Conveying apparatus comprising a plurality of receptacles for the material to be conveyed, a fixed track along which said receptacles are adapted to run, a plurality of hoppers adjacent a loading point on said track, a switch adjacent said loading point, and means whereby a receptacle approaching one of the hoppers operates said switch to divert the next following receptacle to a different hopper.

7. Conveying apparatus comprising a plurality of receptacles for the material to be conveyed, a fixed track along which said receptacles are adapted to run, a plurality of hoppers adjacent a loading point on said track, means for automatically guiding said receptacles to said hoppers in succession, means for automatically loading said receptacles from said hoppers, and means for preventing the automatic loading means of one hopper from operating while the loading means of another hopper is in operation.

8. Conveying apparatus comprising a plurality of receptacles for the material to be conveyed, a fixed track along which said receptacles are adapted to run, a plurality of hoppers adjacent a loading point on said track, a switch adjacent said loading point, means whereby a receptacle approaching one of the hoppers operates said switch to divert the next following receptacle to a different hopper, and means for automatically despatching the loaded receptacles along the track.

9. Conveying apparatus comprising a plurality of receptacles for the material to be conveyed, a fixed track along which said receptacles are adapted to run, a plurality of hoppers adjacent a loading point on said track, means for automatically guiding said receptacles to said hoppers in succession, means for automatically loading said receptacles from said hoppers, means for preventing the automatic loading means of one hopper from operating while the loading means of another hopper is in operation, and means for automatically despatching the loaded receptacles along the track.

10. Conveying apparatus comprising a plurality of receptacles for the material to be conveyed, a fixed track along which said receptacles are adapted to run, a plurality of hoppers adjacent a loading point on said track, a switch adjacent said loading point, means whereby a receptacle, while passing over said switch, contacts directly with a fixed member to cause the oscillation of the switch and thereby divert the next following receptacle to a different hopper.

11. Conveying apparatus comprising a plurality of receptacles for the material to be conveyed, a fixed track along which said receptacles are adapted to run, a plurality of hoppers adjacent a loading point on said track, a switch adjacent said loading point, means whereby a receptacle, while passing over said switch, contacts directly with a fixed member to cause the oscillation of the switch and thereby divert the next following receptacle to a different hopper, and means for preventing the automatic loading means of one hopper from operating while the loading means of another hopper is in operation.

12. Conveying apparatus comprising a plurality of receptacles for the material to be conveyed, a fixed track along which said receptacles are adapted to run, a plurality of hoppers adjacent a loading point on said track, a switch adjacent said loading point, means whereby a receptacle, while passing over said switch, contacts directly with a fixed member to cause the oscillation of the switch and thereby divert the next following receptacle to a different hopper, means for preventing the automatic loading means of one hopper from operating while the loading means of another hopper is in operation, and means for automatically despatching the loaded receptacles along the track.

13. Conveying apparatus comprising a receptacle for the material to be conveyed, a fixed track along which said receptacle is adapted to run, a continuously moving cable, and means for gripping said cable to said receptacle consisting of a pair of rollers having conical surfaces and mounted to rotate on parallel axes coincident with the axes of said conical surfaces.

14. Conveying apparatus comprising a receptacle for the material to be conveyed, a fixed track along which said receptacle is adapted to run, a continuously moving cable, and means for gripping said cable to said receptacle consisting of a pair of rollers having conical surfaces and mounted to rotate on parallel axes coincident with the axes of said conical surfaces, said axes being inclined so that the small diameter of the rollers points toward the direction in which the cable moves.

15. Conveying apparatus comprising a receptacle for the material to be conveyed, a fixed track along which said receptacle is adapted to run, a continuously moving cable, and means for gripping said cable consisting of a pair of rollers arranged so that their adjacent surfaces form a tapered space which is inclined so that the wider part of said space is advanced toward the direction in which the cable runs.

16. Conveying apparatus comprising a plurality of receptacles for the material to to be conveyed, a fixed main track along which said receptacles are adapted to run, a plurality of hoppers arranged on separate branches of the main track, means for automatically guiding said receptacles off the main track to said hoppers in succession, means for automatically loading said receptacles from said hoppers, and means for returning said receptacles one at a time, on to the main track.

17. Conveying apparatus comprising a receptacle for the material to be conveyed, a fixed track along which said receptacle is adapted to run, a continuously moving cable, means for disconnecting and connecting said receptacle from and to said cable for each loading operation, a stationary hopper for the reception of the material to be conveyed, means for automatically loading said receptacle from said stationary hopper, and means actuated by said cable for operating the loading means.

18. Conveying apparatus comprising a plurality of receptacles for the material to be conveyed, a fixed track along which said receptacles are adapted to run, a plurality of hoppers arranged on separate branches of the main track, a continuously running cable, means for connecting said cable to said receptacles, means for automatically disconnecting said cable from each of said receptacles as it approaches a hopper, means for automatically guiding said receptacles off the main track to said hoppers in succession, means for automatically stopping and loading said receptacles from said hoppers, and means for returning said receptacles, one at a time, onto the main track.

19. Conveying apparatus comprising a plurality of receptacles for the material to be conveyed, a fixed track along which said receptacles are adapted to run, a plurality of hoppers adjacent a loading point on said track means for automatically guiding said receptacle to said hoppers in succession, means for automatically loading said receptacles from said hoppers, and means for preventing the automatic loading means of one hopper from operating while the loading means of another hopper is in operation consisting of levers adapted to be normally moved when the corresponding loading means is set in operation, a telescopic rod adapted to close to a minimum length when one of said levers is moved, means for locking said moved lever in position, and means for releasing said locking means when the loading operation is complete.

20. Conveying apparatus comprising a plurality of receptacles for the material to be conveyed, a fixed main track along which said receptacles are adapted to run, a plurality of hoppers arranged on separate branches of the main track, means for automatically guiding said receptacles off the main track to said hoppers in succession, means for automatically arresting said receptacles beneath said hoppers, and means for automatically loading and restarting said receptacles in succession.

In testimony whereof I have signed my name to this specification in the presence of two subscribing witnesses.

Dated this 11th day of September, 1907.

JOHN ASHFORD.

Witnesses:
  C. J. MALLER,
  A. R. MILES.